United States Patent

[11] 3,629,843

[72] Inventor Arnold Herbert Scheinman
Deal, N.J.
[21] Appl. No. 36,233
[22] Filed May 11, 1970
[45] Patented Dec. 21, 1971
[73] Assignee Bell Telephone Laboratories Incorporated
Murray Hill, Berkeley Heights, N.J.

[54] MACHINE PROCESS FOR ASSIGNING INTERCONNECTED COMPONENTS TO LOCATIONS IN A PLANAR MATRIX
14 Claims, 22 Drawing Figs.

[52] U.S. Cl. .......... 340/172.5
[51] Int. Cl. .......... G06f 9/06
[50] Field of Search .......... 340/172.5

[56] References Cited

OTHER REFERENCES

Lee, " An Algorithin For Path Connections and Its Applications" IRE Trans, on Electronic Computers, Sept. 1961 pp. 316-365.

Breuer, " General Survey of Design Automation of Digital Computers," Proceedings of the IEEE, Vol. 54 No. 12 Dec. 1965, pp. 1708-1721.

Kallas " Computer Aided Wiring Designs," Bell Lab. Record, Nov. 1964, pp. 343-349.

Hyman et al. " Computer Automated Design and Thermal Analysis of Printed Circuit Boards," Advances in Electronic Packaging Symposium Record Vol. 8 Aug. 1967 pp. 1-14.

*Primary Examiner*—Raulfe B. Zache
*Assistant Examiner*—R. F. Chapuran
*Attorneys*—R. J. Guenther and Kenneth B. Hamlin

ABSTRACT: Initially, components are assigned arbitrarily to locations in a planar matrix. Horizontal pairwise interchanges of adjacent components are then made if either (1) the absolute sum of the horizontal "moments" of the adjacent components or the system "moment" is made lower thereby. Vertical and diagonal pairwise interchanges are then made according to a similar criteria. This sequence of operations may be repeated as often as desired by the user until an acceptable configuration is obtained.

INVENTOR
A. H. SCHEINMAN
BY
ATTORNEY

INITIAL PLACEMENT

DELMTX

| COMPONENTS | DH | DV |
|---|---|---|
| 1 | -3 | 5 |
| 2 | 6 | 3 |
| 3 | 4 | 5 |
| 4 | -7 | -3 |
| TOTAL | 20 | 16 |

HORIZONTAL INTERCHANGES

| | | |
|---|---|---|
| 1 | 0 | 0 |
| 2 | 0 | 0 |
| 3 | 0 | 4 |

| | | |
|---|---|---|
| 1 | 0 | 0 |
| 0 | 2 | 0 |
| 3 | 0 | 4 |

| | | |
|---|---|---|
| 1 | 0 | 0 |
| 0 | 2 | 0 |
| 0 | 3 | 4 |

| COMPONENTS | DH | DH | DH |
|---|---|---|---|
| 1 | 0 | 1 | 3 |
| 2 | 5 | -1 | 0 |
| 3 | 2 | 3 | 1 |
| 4 | -7 | -4 | -3 |
| | 14 | 9 | 7 |

FIG. 8A

CGPLACE: PROC OPTIONS(MAIN);

```
CGPLACE: PROC OPTIONS(MAIN);
/*CGPLACE CALCULATES A HORIZ&VERTICAL GRADIENT FOR EACH
COMPONENT BY CONSIDERING THE COMPONENT AS MOVEABLE &
COMPONENTS TO WHICH IT CONNECTS AS FIXED.MOMENTS ARE TAKEN
ABOUT MOVEABLE COMP USING MANHATTAN DISTANCES.FIXED COMPS
ARE GIVEN WEIGHTS EQUAL TO NUMBER OF CONNECTIONS TO MOVEABLE
COMPONENT.THE MOMENT IS ZERO IF MOVEABLE COMP IS AT ITS
CENTER OF GRAVITY.THE ABS VAL OF MOMENT THEN IS A MEASURE OF
HOW FAR A COMP IS FROM ITS CG.THE PROGRAM ATTEMPTS TO
MINIMIZE THE SUM OF ABS VALUES FOR ALL COMPONENTS.ADJACENT
GRID POSITIONS HAVE A DISTANCE OF ONE. */
DCL  PLCMTX(NROW,NCOL) EXT CTL   FIXED   BIN   ,
CONMTX(O:NCOMP,O:NCOMP) EXT CTL FIXED BIN,
     (TOTAL,NIT)FIXED(10) BINARY ,
     (LOCMTX(O:NCOMP,2),W(O:NCOMP,2)) EXT CTL FIXED  BINARY,
     DELMTX(O:NCOMP+1,2) EXT CTL  FIXED(14)  BINARY ,
     TRMMTX(NCOMP,4) EXT CTL FIXED(10) BINARY ,
     (P,CN1,CN2,SWITCH) FIXED BINARY ,
     NORM  INIT(1), ARG(4) FIXED  BINARY,
     (COMP(O:NCOMP),TEMPCOMP(O:NCOMP))EXT CTL FIXED BIN,
  TEMP FIXED BINARY;
DCL (CHANGE,OLDCNSUM,NEWCNSUM) FIXED BINARY ;
 DCL OLDSUM FIXED BINARY ;
   /**DELMTX ROW 0 IS FOR EMPTY PLACE MATRIX POS WHICH ARE 0*/;
   /**ROW NCOMP+1 IS FOR ACCUMULATION OF TOTALS***/;
   DCL RTNLOC(3) LABEL ;
   GET LIST(NROW,NCOL) COPY ;
   NIT=0;
   ALLOCATE PLCMTX ;
   PLCMTX=0;
   GET LIST(NCOMP,NPATHS) COPY ;
   ALLOCATE CONMTX , LOCMTX , DELMTX , TRMMTX ;
 ALLOCATE COMP ;
 ALLOCATE TEMPCOMP ;
   ALLOCATE W ;
   W(0,1),W(0,2)=0;
   CONMTX=0;
   TRMMTX=0;
   DELMTX=0;
/*PATHS: PUT LIST('ENTER PATH LIST,FORM IS:');    */
/*  PUT LIST('PATH#,# OF COMPONENTS IN MULT,COMPONENT IDENTS');
    PUT LIST('IF COMPONENT IS A TERMINAL IDENTIFY AS:');
    PUT LIST('-1=TOP,-2=BOTTOM,-3=LEFT,-4=RIGHT');     */
    N1=0;
  READP: GET LIST(I,J) COPY ;
   N1=N1+1;
   IF I¬=N1 THEN GO TO ERR1;
         GET LIST((COMP(K) DO K=1 TO J))   ;
 PATH1: DO K=1 TO J;
   PATH2: DO L=1 TO J;
       N=COMP(K);
       P=COMP(L);
       IF N<1 THEN GO TO P2;
       IF P<1 THEN GO TO NEGP;
```

FIG. 8B

```
CGPLACE: PROC OPTIONS(MAIN);


       IF N¬=P THEN CONMTX(N,P)=CONMTX(N,P)+1;
       GO TO P1;
      NEGP: P=-P;
       TRMMTX(N,P)=TRMMTX(N,P)+1;
      P1: END PATH2;
    P2: END PATH1;
    IF N1>=NPATHS THEN GO TO RDASN ;
  GOTO READP ;
    /****ERROR ROUTINE*****/;
  ERR1: PUT LIST('PATH MISSING,CHECK & DO PATH LISTOVER');
          GOTO PEND ;
    /**********************/;
  /****************************************
  RDASN: PUT LIST('ENTER COMPONENT INITIAL PLACEMENT IN ROW MAJOR
         ORDER,ROW 1 IS TOP ROW');
    PUT LIST('DO FOR ALL POSITIONS,COMP# IN APPROP POS, 0 IN
    EMPTY POSITIONS');
   **************************************/
  RDASN: NIT=0 ;
    GET LIST(PLCMTX);
  RD1: DO I=1 TO NROW;
    RD2: DO J=1 TO NCOL;
         K=PLCMTX(I,J);
  /* K IS NEG FOR COMPONENTS WHICH ARE FIXED ON THE BOARD*/
  IF K<0 THEN K=-K ;
         LOCMTX(K,1)=I;
         LOCMTX(K,2)=J;
         END RD2;
      END RD1;
    /*******************/;
         /*CALCULATE EFFECTIVE WEIGHTS*/
  W1: DO K=1 TO NCOMP;
      TEMP=0;
    W2: DO I=1 TO NCOMP;
         TEMP=TEMP+CONMTX(K,I);
         END W2;
      W(K,1)=TEMP+TRMMTX(K,3)+TRMMTX(K,4);
      W(K,2)=TEMP+TRMMTX(K,1)+TRMMTX(K,2);
      /*W(K,1)&W(K,2) ARE EFFECTIVE HOR & VERT WEIGHTS RESPFOR
      KTH COMPONENT*/;
      END W1;
  DELTAH: RTNLOC(NORM)=DELTAV;
   /*SET ARGS FOR CALC OF DELTA HOR COMPONENT OF MOMENT*/
  DELH: ARG(1)=2;
     ARG(2)=3;
     ARG(3)=4;
     ARG(4)=1;
     GO TO CALC;
  DELTAV: RTNLOC(NORM)=SCORE;
   /*SET ARGS FOR CALC OF DELTA VER COMPONENT OF MOMENT*/
  DELV: ARG(1)=1;
     ARG(2)=1;
```

FIG. 8C

```
CGPLACE: PROC OPTIONS(MAIN);



           ARG(3)=2;
           ARG(4)=2;
           GO TO CALC;
          SCORE: CALL PRNTOT ;
          GOTO CHGTOT ;
           /*****CALC DELTA HORIZONTAL AND DELTA VERTICAL DISTANCESFOR
           EACH COMPONENT THEN SUM THEM.THE SUM IS USED LATER AS A
           FIGURE OF MERIT****************/;
           /******THE ROUTINE IS USED SEPARATELY FOR HOR AND VERT. HOR
           OR VERT IS CALC BY APPROP SETTING OF ARG(1:4)  ***/;
         CALC: DO I1=1 TO NCOMP;
             TEMP=0;
             /**CALCULATION FOR COMPONENT CONNECTIONS***/;
           CALC1: DO J1=1 TO NCOMP;
                IF I1=J1 THEN GO TO CH1END;
                K=CONMTX(I1,J1);
                L=LOCMTX(J1,ARG(1))-LOCMTX(I1,ARG(1));
                L=K*L;
                TEMP=TEMP+L;
             CH1END: END CALC1;
             /** CALCULATION FOR TERMINAL CONNECTIONS***/;
           CALC2: DO J1=ARG(2),ARG(3);
                IF J1=2 THEN M=NROW+1;
                IF J1=1 THEN M=0;
                IF J1=3 THEN M=0;
                IF J1=4 THEN M=NCOL+1;
                K=TRMMTX(I1,J1);
                L=M-LOCMTX(I1,ARG(1));
                L=K*L;
                TEMP=TEMP+L;
                END CALC2;
             DELMTX(I1,ARG(4))=TEMP;
            ECALC: END CALC;
            /**CALCULATE THE TOTAL FOR ALL COMPONENTS**/;
          CTOTL: DELMTX(NCOMP+1,ARG(4))=0;
          CTOTH1: DO I1=1 TO NCOMP;
             DELMTX(NCOMP+1,ARG(4))=DELMTX(NCOMP+1,ARG(4))+
          ABS(DELMTX(I1,ARG(4))) ;
             END CTOTH1;
           GOTO RTNLOC(NORM) ;
           /****************************************/
         CHGTOT: CHANGE=0 ;
            /***THE HORIZONTAL CHK IS MADE IN ROW MAJOR ORDER WITH ROW 1
            AS TOP ROW*******/;
          SWHOR: J,I=1;
          SH1: CN1=PLCMTX(I,J);
            CN2=PLCMTX(I,J+1);
            /**CN1=CN2 ONLY WHEN BOTH ARE 0 INDICATING EMPTY POSITIONS*/;
            IF CN1=CN2 THEN GO TO SWHEND;
          /* IF CN1 OR CN2 ARE NEG THEN DON'T SWITCH*/
          IF CN1<0 |CN2<0 THEN GOTO SWHEND  ;
           OLDSUM,NEWSUM = 0  ;
```

FIG 8D

```
CGPLACE: PROC OPTIONS(MAIN);


          OLDCNSUM,NEWCNSUM=0 ;
          NN=1 ;
           CALL SWCHK ;
           IF SWITCH=0 THEN GOTO SWHEND ;
            /****INTERCHANGE COMPONENTS****/;
          CHANGE= 1 ;
          HB: LOCMTX(CN1,2)=J+1;
            LOCMTX(CN2,2)=J;
          GOOD: PLCMTX(I,J)=CN2;
            PLCMTX(I,J+1)=CN1;
          NN=1 ;
          CALL RECALC ;
          SWHEND: IF J<NCOL-1 THEN GO TO SHJ;
            IF I<NROW THEN GO TO SHI;
            GO TO SWVERT;
          SHJ: J=J+1;
            GO TO SH1;
          SHI: I=I+1;
            J=1;
            GO TO SH1;
            /****SWVERT IS SAME AS SWHOR EXCEPT THAT VERTICAL COMPONENT
            OF LENGTH IS CHECKED****/;
          SWVERT: J,I=1;
          SV1: CN1=PLCMTX(J,I);
            CN2=PLCMTX(J+1,I);
            IF CN1=CN2 THEN GO TO SWVEND;
          IF CN1<0 |CN2<0 THEN GOTO SWVEND  ;
            OLDSUM,NEWSUM=0;
          OLDCNSUM,NEWCNSUM=0 ;
          NN=2 ;
           CALL SWCHK ;
           IF SWITCH=0  THEN  GOTO SWVEND  ;
          CHANGE= 1 ;
          VB: LOCMTX(CN1,1)=J+1;
            LOCMTX(CN2,1)=J;
          GOODV: PLCMTX(J,I)=CN2;
            PLCMTX(J+1,I)=CN1;
          NN=2 ;
          CALL RECALC ;
          SWVEND: IF J<NROW-1 THEN GO TO SVJ;
            IF I<NCOL THEN GO TO SVI;
          GOTO SWDIAG ;
          SVJ: J=J+1;
            GO TO SV1;
          SVI: I=I+1;
            J=1;
            GO TO SV1;
            /********************************/
           SWDIAG: DO I=1 TO NROW-1 ;
                   DO J=1 TO NCOL-1 ;
                   CN1=PLCMTX(I,J) ;
                   CN2=PLCMTX(I+1,J+1);
```

FIG. 8E

```
CGPLACE: PROC OPTIONS(MAIN);

          IF CN1=CN2  THEN GOTO  SWDEND ;
IF CN1<0 |CN2<0 THEN GOTO SWDEND  ;
          OLDSUM,NEWSUM = 0 ;
OLDCNSUM,NEWCNSUM=0 ;
NN=1 ;
 CALL SWCHK ;
          TEMPCOMP=COMP ;
NN=2 ;
 CALL SWCHK ;
 /*OLDSUM,NEWSUM NOW =DELTA HOR +DELTA VERT*/;
 IF SWITCH=0 THEN  GOTO  SWDEND ;
CHANGE= 1 ;
 LOCMTX(CN1,1)= I+1 ;
 LOCMTX(CN1,2)= J+1 ;
 LOCMTX(CN2,1)= I   ;
 LOCMTX(CN2,2)= J   ;
 PLCMTX(I,J)=CN2    ;
 PLCMTX(I+1,J+1)=CN1;
NN=2 ;
CALL RECALC ;
 COMP = TEMPCOMP;
NN=1 ;
CALL RECALC ;
SWDEND: END; END;
  /*********************************/
SWDIAGA: DO I=1 TO NROW-1 ;
         DO J=2 TO NCOL  ;
         CN1=PLCMTX(I,J) ;
         CN2=PLCMTX(I+1,J-1);
          IF CN1=CN2  THEN GOTO  SWDAEND ;
IF CN1<0 |CN2<0 THEN GOTO SWDAEND ;
         OLDSUM,NEWSUM = 0 ;
OLDCNSUM,NEWCNSUM=0 ;
NN=1 ;
CALL SWCHKN ;
          TEMPCOMP=COMP ;
NN=2 ;
 CALL SWCHK ;
 /*OLDSUM,NEWSUM NOW =DELTA HOR +DELTA VERT*/;
 IF SWITCH=0 THEN  GOTO  SWDAEND ;
   CHANGE = 1 ;
 LOCMTX(CN1,1)= I+1 ;
 LOCMTX(CN1,2)= J-1 ;
 LOCMTX(CN2,1)= I   ;
 LOCMTX(CN2,2)= J   ;
 PLCMTX(I,J)=CN2    ;
 PLCMTX(I+1,J-1)=CN1;
NN=2 ;
CALL RECALC ;
 COMP = TEMPCOMP;
NN=1 ;
CALL RECALC ;
```

FIG. 8F

```
CGPLACE: PROC OPTIONS(MAIN);

SWDAEND: END; END;
  /*********************************/
ITER: NIT=NIT+1;
DCL NETCN INIT(1) ;
DCL   NET INIT(1) ;
IF NIT=10 THEN DO;
      NET=0 ;
 NETCN=0 ;
  END ;
IF NIT=15 THEN  NETCN=-100 ;
  /************************/;
MATRIX: PUT SKIP(2) ;
  PUT LIST('XXXXXXXXXXXXXXXXXXXXXXXXXXXXXXXXXXXXXXXX');
PUT SKIP ;
  PUT LIST('THE PLACEMENT MATRIX IS NOW........');
 PUT SKIP ;
PLM1: DO I=1 TO NROW;
  PLM2: DO J=1 TO NCOL;
 PUT EDIT(PLCMTX(I,J))(F(5)) ;
      END PLM2;
 PUT  SKIP ;
    END PLM1;
 CALL PRNTOT ;
 IF CHANGE=1 THEN GOTO CHGTOT ;
 GOTO  PLCEND
  /***********************/;
  /****************************************/;
PUT SKIP ;
 PLCEND: PUT LIST('INITIAL PLACEMENT OPTIMIZED')SKIP ;
PUT SKIP ;
  PUT LIST('COMPONENT#....HORIZONTAL BIAS...VERTICAL BIAS');
  /******************************************/
ROT: DO K=1 TO NCOMP;
    PUT EDIT(K,DELMTX(K,1),DELMTX(K,2))(SKIP(1),F(6),F(16),
F(16));
    END ROT;
PUT EDIT('HORIZONTAL BIAS... +=TOWARD RIGHT,-=TOWARD LEFT',
 'VERTICAL BIAS... +=TOWARD BOTTOM, -=TOWARD TOP')
 (SKIP,A,SKIP,A) ;
  /*******************************************/
 SWCHK: PROC ;
  /*NN=1 FOR HOR CHK,=2 FOR VERT CHK */
   /*OLDSUM=OLD DELTAH SUM,NEWSUM =NEW DELTAH SUM,COMP(K)=NEW
 DELTAH FOR  KTH COMPONENT***/
 OLDSUM=OLDSUM+DELMTX(NCOMP+1,NN) ;
OLDCNSUM=OLDCNSUM+ABS(DELMTX(CN1,NN))+ABS(DELMTX(CN2,NN)) ;
        COMP(CN1)=DELMTX(CN1,NN)-W(CN1,NN)-CONMTX(CN1,CN2) ;
   COMP(CN2)=DELMTX(CN2,NN)+W(CN2,NN)+CONMTX(CN2,CN1) ;
   NEWSUM=ABS(COMP(CN1))+ABS(COMP(CN2))+NEWSUM;
NEWCNSUM=ABS(COMP(CN1))+ABS(COMP(CN2))+NEWCNSUM ;
       DO L=1 TO NCOMP;
     IF L=CN1|L=CN2 THEN GO TO TH ;
```

FIG. 8G

```
CGPLACE: PROC OPTIONS(MAIN);

        COMP(L)=DELMTX(L,NN) ;
    COMP(L)=COMP(L)+CONMTX(L,CN1)-CONMTX(L,CN2) ;
        NEWSUM=NEWSUM+ABS(COMP(L));
          TH:  END ;
     IF NEWCNSUM-OLDCNSUM<NETCN THEN SWITCH = 1 ;
      ELSE SWITCH =0 ;
     IF NEWSUM-OLDSUM<NET THEN SWITCH = 1 ;
      END SWCHK ;
       /*******************************************/
     /*************************************************/
     /*SWCHKN IS USED WHEN CN1 MOVES IN NEG DIRECTION & CN2 IN
     POS DIRECTION.TWO ROUTINES ARE USED INSTEAD OF MODIFYING SWCHK
     SO THAT THE RUNNING TIME IS KEPT FAST****/
     SWCHKN: PROC ;
      /*NN=1 FOR HOR CHK,=2 FOR VERT CHK */
       /*OLDSUM=OLD DELTAH SUM,NEWSUM =NEW DELTAH SUM,COMP(K)=NEW
     DELTAH FOR  KTH COMPONENT***/
     OLDSUM=OLDSUM+DELMTX(NCOMP+1,NN) ;
    OLDCNSUM=OLDCNSUM+ABS(DELMTX(CN1,NN))+ABS(DELMTX(CN2,NN)) ;
            COMP(CN1)=DELMTX(CN1,NN)+W(CN1,NN)+CONMTX(CN1,CN2) ;
       COMP(CN2)=DELMTX(CN2,NN)-W(CN2,NN)-CONMTX(CN2,CN1) ;
       NEWSUM=ABS(COMP(CN1))+ABS(COMP(CN2))+NEWSUM;
    NEWCNSUM=ABS(COMP(CN1))+ABS(COMP(CN2))+NEWCNSUM ;
          DO L=1 TO NCOMP;
        IF L=CN1|L=CN2 THEN GO TO THN  ;
        COMP(L)=DELMTX(L,NN) ;
    COMP(L)=COMP(L)-CONMTX(L,CN1)+CONMTX(L,CN2) ;
        NEWSUM=NEWSUM+ABS(COMP(L));
          THN: END ;
     IF NEWCNSUM-OLDCNSUM<NETCN THEN SWITCH = 1 ;
      ELSE SWITCH =0 ;
     IF NEWSUM-OLDSUM<NET THEN SWITCH = 1 ;
       END SWCHKN ;
       /*********************************/
     RECALC:  PROC ;
      /*NN=1 FOR DELTA HOR,=2 FOR DELTA VERT */
       /***RECALCULATE DELTA MATRIX*****/;
       DELMTX(NCOMP+1,NN)=0 ;
     REC1: DO L=1 TO NCOMP;
    DELMTX(L,NN)=COMP(L) ;
    REC2: DELMTX(NCOMP+1,NN)=DELMTX(NCOMP+1,NN)+ABS(DELMTX(L,NN));
       RECE1: END REC1;
      END  RECALC ;
       /*******************************************/
      PRNTOT: PROC ;
     PUT SKIP ;
        PUT EDIT('ITERATIONS= ',NIT,
     '  TOTAL HORIZONTAL NET BIAS  = ',DELMTX(NCOMP+1,1),
    ' TOTAL VERTICAL NET BIAS  = ',DELMTX(NCOMP+1,2))
     (A,F(4),SKIP(1),A, F(4),A,F(4)) ;
      END  PRNTOT ;
       /*******************************************/
           PEND:  END CGPLACE ;
```

MACHINE PROCESS FOR ASSIGNING INTERCONNECTED COMPONENTS TO LOCATIONS IN A PLANAR MATRIX

BACKGROUND OF THE INVENTION

This invention relates to a method for operating a machine, such as a digital computer, in accordance with an algorithm for assigning or placing elements in a planar matrix.

Considerable interest has centered on finding automated methods of aiding in product design. This is especially true in the areas such as printed and integrated circuit design. With the miniaturization of circuits and components and the corresponding increase in component density on printed and integrated circuit structures, the problem of properly placing components on such structures, to facilitate easy routing of interconnections has become more acute.

A number of methods employing various placement criteria have been devised for automated component placement. The placement criterion most commonly employed in such methods is "minimization of total wire length" (see, for example, Rutman, R. A., "An Algorithm for the Placement of Interconnected Elements Based on Minimum Wire Length," AFIPS Conference Proceedings, Vol. 25, 1964, SJCC, pp. 477–491). It has been suggested that utilization of this and similar criteria which tends to cause the components to converge on each other may, at times, result in localized areas of congestion on the circuit structure. ("Congestion" may be defined as a concentration of leads in some area around a component.) This, in turn, can make routing of interconnections difficult.

SUMMARY OF THE INVENTION

It is an object of this invention, in view of the above-described prior art arrangements, to provide a method of placing interconnected elements in a planar matrix so as to facilitate ease of routing.

It is another object of the present invention that such method be implementable on a general purpose computer.

It is still another object of the invention that such implementation have a fast running time.

These and other objects of the present invention are realized in a specific illustrative algorithm which utilizes a "center of gravity" criteria for the placement of components in a planar matrix. That is, the components are assigned locations in the matrix such that the sum of the "movements" of the components appears to be minimized. This algorithm, to be described in more detail hereafter, may be programmed to operate on a general purpose computer.

Although reference will hereafter be made to such terms as "components,""matrix," etc. in discussing the algorithm, it should be understood that such items would be represented by electrical signals of one kind or another in the implementation of the algorithm on a general purpose computer. Thus, for example, when discussing the "interchanging of components" in a matrix, it should be understood that this means interchanging stored data (in memory) which represents the components. The invention is described in these terms for clarity and because such terms are familiar to persons who might implement the algorithm on a general purpose computer, i.e., programmers.

Initially, the components are assigned either arbitrarily or by some "initial placement" process to locations in a planar matrix having left, right, top and bottom terminals. Pairwise interchanges of horizontally adjacent electrical are then made if either (1) the absolute sum of the horizontal moments of the components interchanged or (2) the system moment is made lower thereby. The horizontal moment of a component $i$ is defined by $$MH_i=\sum_{k=1}^{N} W_{ik}DH_{ik}+\sum_{k=L,R} W_{ik}DH_{ik}$$

where $W_{ik}$ equals the number of connections from component $i$ to component (or terminal) $k$, $DH_{ik}$ is the horizontal distance therebetween, the symbols $L$ and $R$ represent the left and right terminals respectively of the matrix, and $N$ is the total number of components. The system moment is defined by $$SM=\sum_{k=1}^{N}|MH_k|+\sum_{k=1}^{N}|MV_i|$$

where $MV_i$ equals $$\sum_{k=1}^{N} W_{ik}DV_{ik}+\sum_{k=T,B} W_{ik}DV_{ik},\ DV_{ik}$$

equals the vertical distance between component $i$ and component (or terminal) $k$, and $T$ and $B$ represent the top and bottom terminals respectively of the matrix. Distances to the left of and up from a component are negative while distances to the right of and down from a component are positive. Note, that for horizontal interchanges, there will be no change in $MV$ and for vertical interchanges, there will be no change in $MH$.

After all horizontally adjacent components have been examined for possible interchange, vertical and diagonal pairwise interchanges are then made according to a criterion equivalent to that for horizontal interchanges. This sequence of operations may be repeated as often as desired by the user.

The strategy of interchanging components if either of the above-mentioned criterion is fulfilled causes considerable movement of the components resulting in more possibilities for interchanges and a lower probability of a component being blocked, i.e., locked into an undesirable location. The criteria could also be relaxed to allow interchange even if there were no change in MH (or MV) or SM. This would be done for initial iterations to allow even more initial movements of components.

BRIEF DESCRIPTION OF THE DRAWINGS

A complete understanding of the present invention and of the above and other objects and advantages thereof may be gained from a consideration of the following detailed description of an illustrative showing thereof presented hereinbelow in connection with the accompanying drawings in which:

FIG. 8A, 8B, 8C, 8D, 8E, 8F and 8G show a program implementation of the algorithm of FIG. 2.

DETAILED DESCRIPTION

Figure 1A:
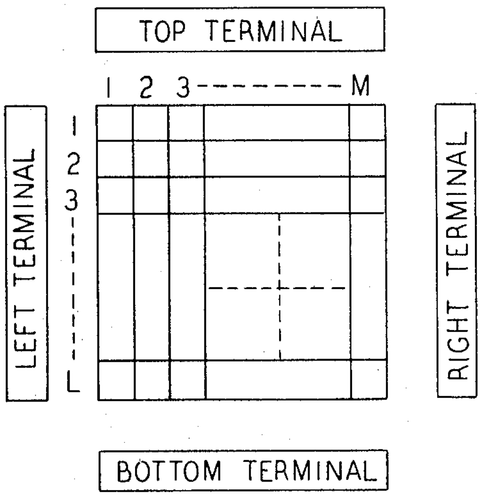
FIG. 1A shows a graphical representation of a planar matrix structure on which components might be placed.

In accordance with the present invention, interconnected components or elements are to be assigned locations on a planar matrix structure of the type graphically shown in FIG. 1A. The structure thereshown includes L×M positions or locations in which a set of components would be assigned. Connections of the components to other components outside the set would be made via a top, bottom, left or right terminal as the case required.

Figure 1B:
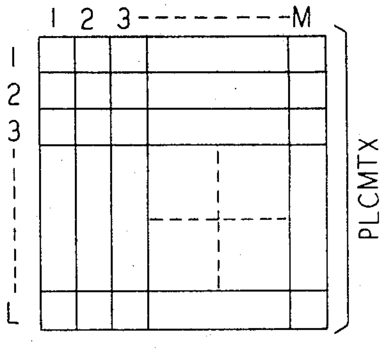
FIG. 1B and 1C show graphical representations of various matrices utilized in an implementation of the present invention.
Figure 1C:
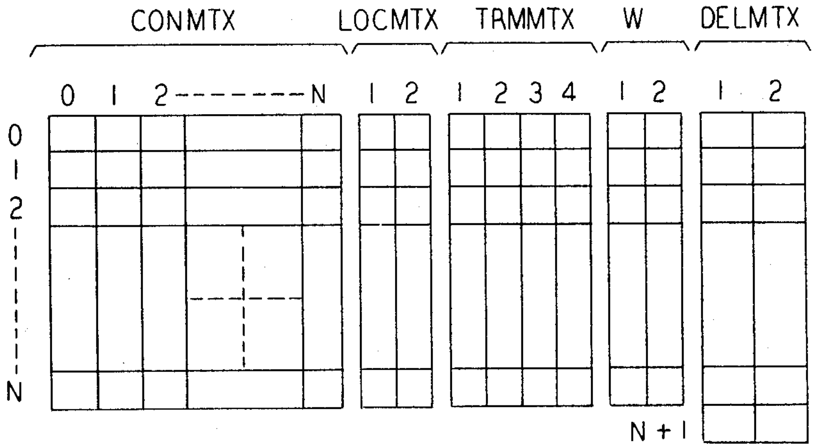

FIG. 1B and 1C show graphical representations of various matrices which will be employed in an illustrative algorithm to be described later. These matrices include a placement matrix (PLCMTX), a connection matrix (CONMTX), a location matrix (LOCMTX), a terminal matrix (TRMMTX), a composite weight matrix (W), and a component moment matrix (DELMTX). PLCMTX (shown in FIG. 1B) is simply an L by M dimension matrix which defines the initial or starting arrangement of components as specified arbitrarily or by some initial component placement process. The illustrative algorithm begins with an arrangement of components as defined by this matrix and then commences to rearranged the components as will be discussed. The entries at the intersections of various rows and columns of PLCMTX represent the various components to be examined.

CONMTX (shown in FIG. 1C) is an N+1 by N+1 matrix in which the entry at the intersection of row $i$, and implementations $j$ specifies the number of interconnections between the the $i^{th}$ and $j^{th}$ components. Note that row $i$ refers to the $(i+1)^{th}$ row because rows are numbered from 0 to N. Hence row 0 is the $1^{st}$ row, etc. Row O represents a fictitious component which is assumed to be located in all empty locations of PLCMTX. This enables empty locations to be treated the same as occupied locations thus eliminating the need to provide special tests, e.g. in any computer program implementation of the algorithm, to differentiate between empty and occupied locations. This would speed up the running time of any such implementation. The parameter N represents the total number of components in question.

LOCMTX (FIG. 1C) is an N+1 by 2 matrix in which the entries at the intersections of row $i$ with the $1^{st}$ and $2^{nd}$ column specify the row and column respectively in PLCMTX where component $i$ is located.

TRMMTX (FIG. 1C) is an N+1 by 4 matrix in which the entries at the intersections of row $i$ with the $1^{st}$, $2^{nd}$, $3^{rd}$ and $4^{th}$ columns specify the number of connections from component $i$ to the top, bottom, left, and right edges respectively of the structure on which the components are to be mounted.

The W matrix (FIG. 1C) is an N+1 by 2 matrix in which the entry of the intersection of row $i$ and the $1^{st}$ column represents the sum of the entries of row $i$ of CONMTX plus the entries of row $i$ and the $3^{rd}$ and $4^{th}$ columns of TRMMTX. The entry of the intersection of row $i$ and the $2^{nd}$ column of the W matrix represents the sum of the entries of row $i$ of CONMTX plus the entries of row $i$ and the $1^{st}$ and $2^{nd}$ columns of TRMMTX. The significance of the above entries of the W matrix can be explained as follows. The weight of a component (defined earlier) might be viewed as a measure of the effect of the movement of that component on the total system. Movement of a component in the horizontal direction however does not affect the connections of that component to the top and bottom terminals of the structure and likewise the movement of a component in the vertical direction does not affect the connections of the component to the left and right terminals of the structure. Therefore two entries for each component are provided in the W matrix—one entry specifying the weight of a component including the effect of being connected to the top and bottom terminals and the other entry specifying the weight of the component including the effect of being connected to the left and right terminals of the structure. The utility of this will become apparent later.

DELMTX (FIG. 1C) is an N+2 by 2 dimension matrix, in which the entry at the intersection of row $i$ and the $1^{st}$ column specifies the net horizontal movement for the $i^{th}$ component. This entry is calculated in accordance with the expression $$MH_i=\sum_{k=1}^{N} W_{ik}DH_{ik}+\sum_{k=L,R} W_{ik}DH_{ik}$$

given earlier. The "horizontal distance," $DH_{ik}$, between components $i$ and $k$ is equal to the distance separating the two columns in PLCMTX in which components $i$ and $k$ are located. If the two components are in the same column, then, of course, the horizontal distance is zero. The expression includes the effects of connecting to the left and right terminals as well as the effects of connecting to the other components. The entry at the intersection of row $i$ and the $2^{nd}$ column of DELMTX specifies the net vertical moment for the $i^{th}$ component. This entry is calculated in accordance with the expression $$MV_i=\sum_{k=1}^{N} W_{ik}DV_{ik}+\sum_{k=T,B} W_{ik}DV_{ik}$$

also given earlier. The "vertical distance," $DV_{ik}$, between components $i$ and $k$ is equal to the distance separating the two rows in PLCMTX in which components $i$ and $k$ are located. The expression also includes the effect of connecting to the top and bottom edges of PLCMTX. The entry at the intersection of the last row and the $1^{st}$ column of DELMTX specifies the net horizontal system moment which equals the sum of the absolute values of all entries of rows 1 to N of the $1^{st}$ column, i.e., $$SM_H=\sum_{k=1}^{N}|MH_k|$$

Finally, the intersection of the last row and the $2^{nd}$ column specifies the net vertical system moment which equals the sum of the absolute values of the entries of rows 1 to N of the $2^{nd}$ column, i.e., $$SM_V=\sum_{k=1}^{N}|MV_k|$$

Figure 2:
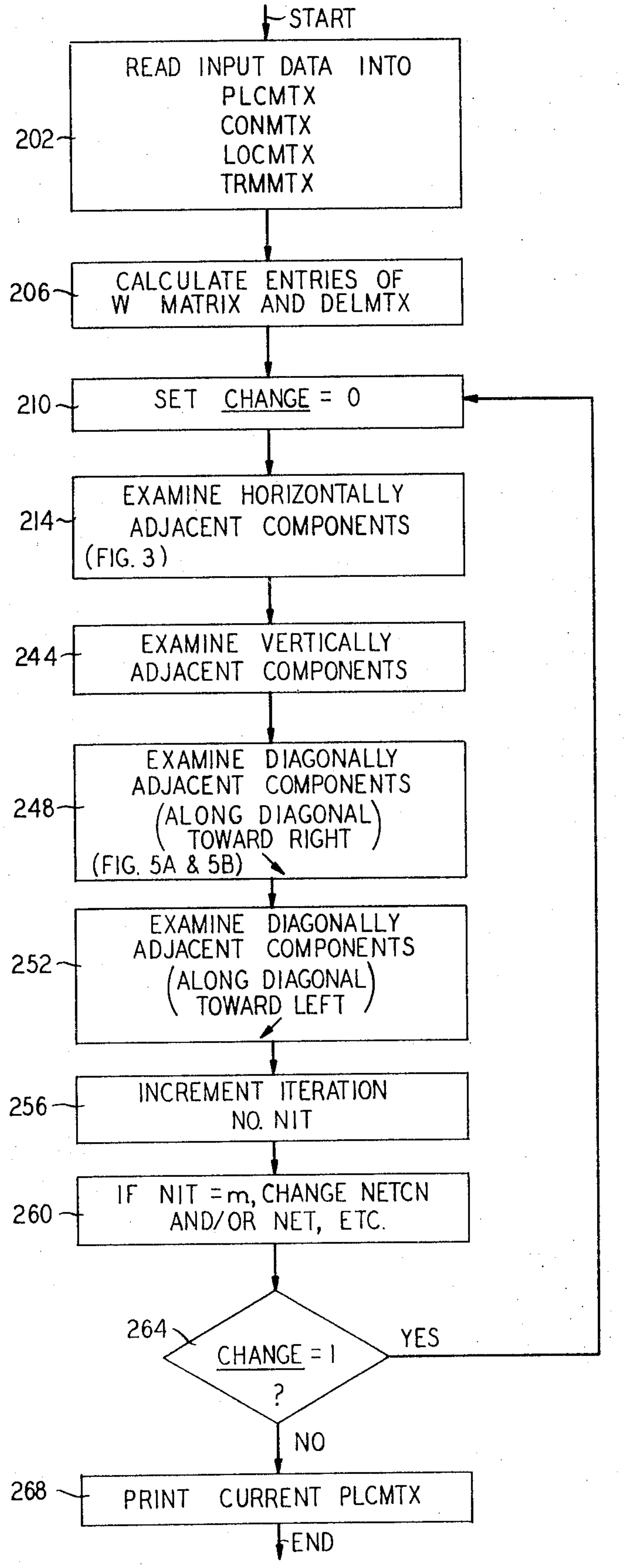
FIG. 2 shows a flow diagram representing a specific illustrative machine algorithm for practicing data processing in accordance with the present invention.

A specific illustrative algorithm for carrying out the principles of the present invention may be described with respect to the flow chart shown in FIG. 2. This algorithm is implementable on a general purpose digital computer such as, for example, an IBM 360/65.

The first step of the algorithm, as indicated in block 202 of FIG. 2, is to read input data into memory in portions set aside for a placement matrix (PLCMTX), a connection matrix (CONMTX), a location matrix (LOCMTX), and a terminal matrix (TRMMTX). The information in PLCMTX specifies the initial placement of components.

The next step of the algorithm, as indicated in block 206 of FIG. 2, is to calculate the entries for a W matrix and a component moment matrix (DELMTX) in accordance with the previously noted expressions. A variable, designated "CHANGE," is then set equal to zero. This variable indicated whether or not a change in the placement of components have been made during an iteration of the algorithm. The use of this variable will be indicated later.

Figure 3:
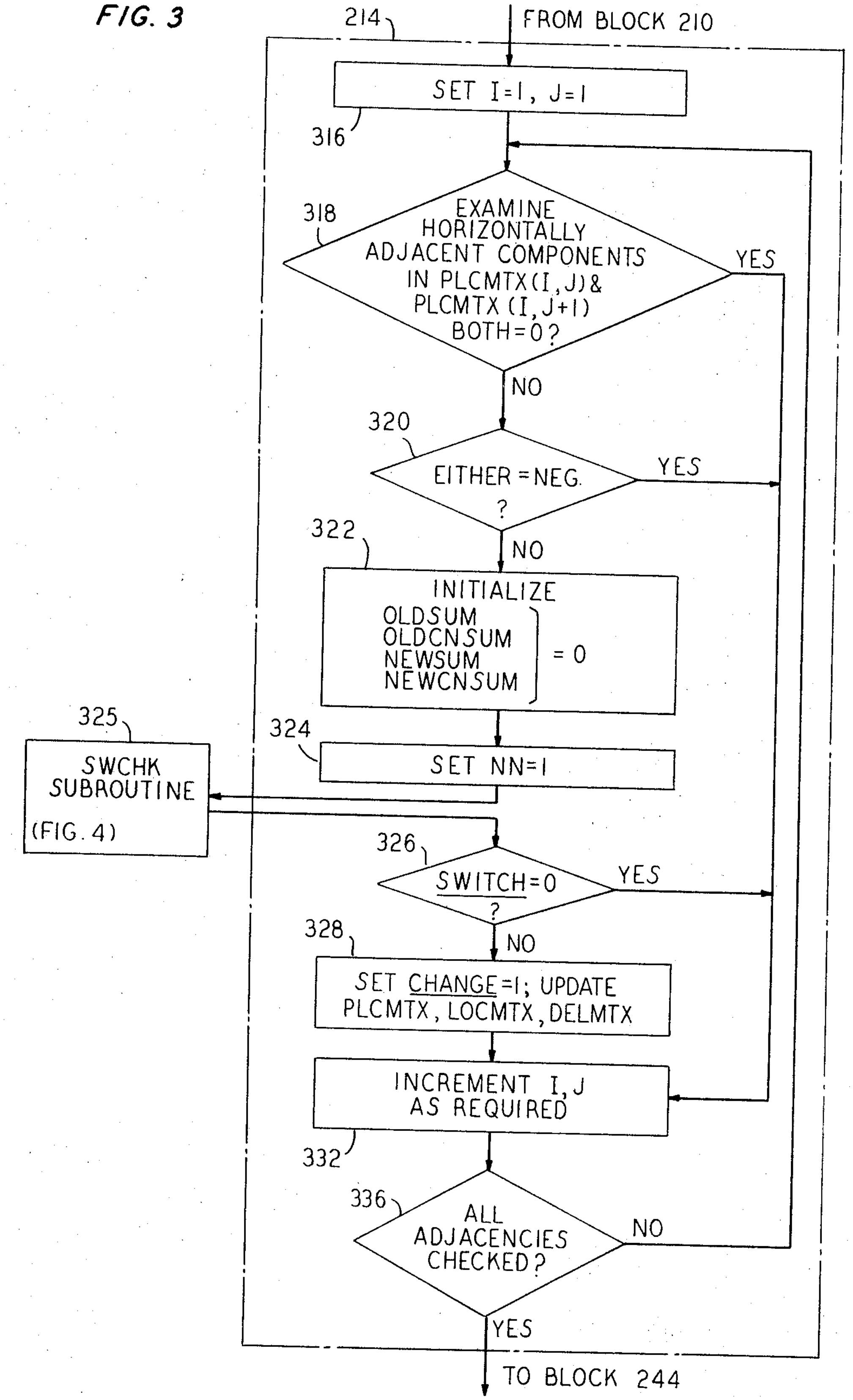
FIG. 3 shows a flow diagram representing the detailed steps of block 214 of the FIG. 2 algorithm.

The next step of the algorithm, is to select for analysis two adjacent locations in PLCMTX. This step is represented generally to block 214 of FIG. 2 which is shown in detail in FIG. 3. The locations selected are designated by the variations I and J which specify the row and column respectively of one location in PLCMTX, the other location being specified by incrementing one of these variables. Thus, I and J are both initially set equal to "1" specifying the location—row 1, column 1. The other location to initially be examined is I and J+1. (See block 316 of FIG. 3) These locations are then examined to determine if both do *not* contain components (block 318 of FIG. 3). If neither contains a component, then the algorithm goes to block 332 where either the variable I or the variable J is incremented by "1" (this will be explained later). If either contains a component, the algorithm moves to block 320.

At block 320, the locations are examined to determine if either component is negative. A negative specification for a component indicates that the component indicates that the component is not to be moved from the location (for whatever reason the user has). If either component is specified as being negative, the algorithm moves to block 332. If neither is negative, the algorithm moves to block 322 where variables OLDSUM, OLDCNSUM, NEWSUM and NEWCNSUM are set equal to zero. These variables will be defined shortly. In the next step in the algorithm (block 324), a variable NN is set equal to 1. Setting *NM*=1 indicates that horizontal adjacencies are to be examined for possible interchange. As will be indicated later, if vertical adjacencies are to be examined, then NN would be set equal to 2. From block 324, the algorithm moves to a subroutine SWCHK (block 325) shown in detail in FIG. 4. The subroutine SWCHK will be described assuming *NM*=1.

The first step of the subroutine is to set the variable OLDSUM equal to the previous value of this variable plus (since *NM*= 1) the present value of the net horizontal system moment $SM_H$ (OLDSUM would be set equal to its previous value plus the present value of the net vertical system moment $SM_V$ is *NM*=2). For examination of strictly horizontal (or vertical) adjacencies, the previous value of OLDSUM is always zero, but for examination of diagonal adjacencies (to be discussed later), OLDSUM may be zero or some other value. The net horizontal system moment as indicated earlier is given by the entry in the $1^{st}$ column and row N+1 of DELMTX.

Figure 4:
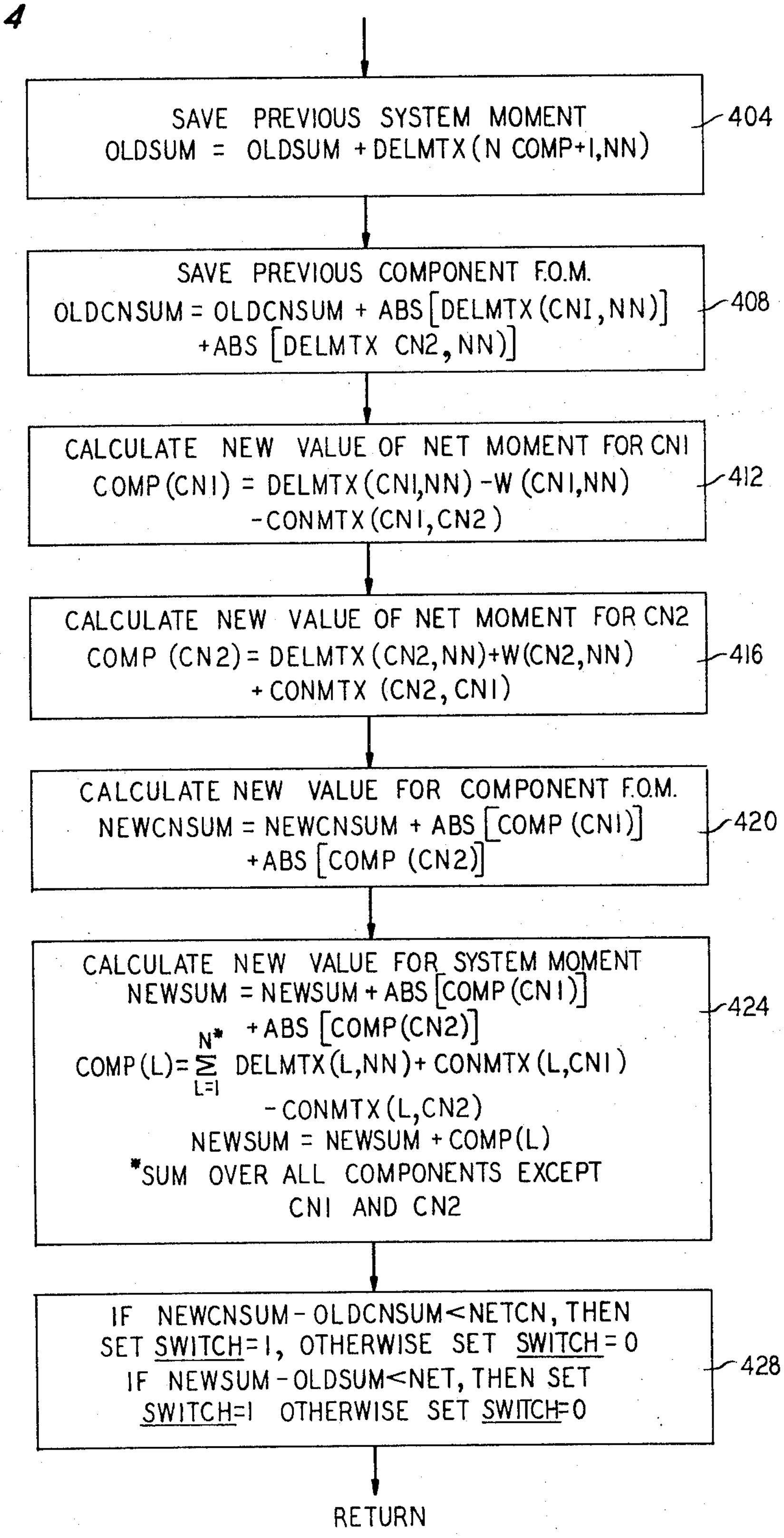
FIG. 4 shows a flow diagram of a subroutine utilized in the algorithm represented in FIG. 2.

The next step of SWCHK is to set the variable, OLDCNSUM, equal to the previous value of this variable plus the present value of the sum of the absolute values of the horizontal moments (since *NM*+1) of the components being examined (see block 408 of FIG. 4). Again, for strictly horizontal (or vertical) adjacencies, the previous value of OLDCNSUM is always zero, whereas for diagonal adjacencies, it may be zero or other values. The net horizontal moment of component 1 (CN 1), i.e., the component located in PLCMTX (*I*=1, *J*=1), is found in DELMTX (CN 1, *NN*=1), as indicated in block 408. The net horizontal moment of component 2 (CH 2), i.e., of the component located in PLCMTX (*I*=1, *J*+1=2), is found in DELMTX (CN 2, *NN*=1). It should be understood that one of the two locations of PLCMTX Being examined may not contain a component. Such locations, as indicated earlier, are assumed to contain a fictitious component 0 represented by row 0. The contents of row 0 are all zero.

Next, a new net horizontal moment for CN 1 (represented by COMP (CN 1)) is calculated assuming CN 1 has been interchanged with CN 2 (see block 412). This calculation is made as follows. Since CN 1 would be moved to the right in the interchange and therefore in the positive direction, the entry found in W (CN 1, *NN*=1) and the entry found in CONMTX (CN 1, CN 2) are both *subtracted* from the entry found in DELMTX (CN 1, *NN*=1). In other words, the composite horizontal weight of CN 1 and the weight of CN 1 with respect to CN 2 are subtracted from the current net horizontal moment of CN 1. This yields the new net horizontal moment for CN 1 assuming it has been interchanged. This rather simple calculation for deriving the new moment is made possible by the unique method of storing the parameters in the various matrices utilized and by restricting component movement to one space. Lengthy recomputation of the horizontal moment of a component from the individual connections of the component (for each contemplated interchange) is thereby avoided.

Calculation of a new net horizontal moment for CN 2, on the assumption it has been interchanged with CN 1, is carried out in a similar fashion except CN 2 would be moved to the left and thus in the negative direction so the composite horizontal weight of CN 2 and the weight of CN 2 with respect to CN 1 are added rather than subtracted from the current net horizontal moment of CN 2. This is indicated in block 416.

A new figure of merit for the components interchanged is then computed in accordance with block 420. This new figure of merit, identified by the variable NEWCNSUM, is equal to the previous value of NEWCNSUM (which for strictly horizontal or vertical adjacencies is zero) plus the absolute value of the net horizontal moment of CN 1 (computed in block 412) and the absolute value of the net horizontal moment of CN 2 (computed in block 416).

The next step of the subroutine is to calculate the new horizontal system moment $SM_H$ in accordance with block 424. This is done by first setting variable NEWSUM equal to the previous value of NEWSUM (which, for strictly horizontal or vertical adjacencies, as in the previous steps, is zero) plus the absolute value of the new net horizontal moment of CN 1 and the absolute value of the new net horizontal moment of CN 2. The net horizontal moments for all *other* components L are then calculated by the formula $$\mathrm{COMP}(L)=\sum_{L=1}^{N} DELMTX(L, NN=1) +CONMTX(L, CN\ 1)-CONMTX(L, CN\ 2)$$

where the summation is over all N components except CN 1 and CN 2. In other words, for each component L, the entry in CONMTX(L,CN 2) is subtracted from the entry in DELMTX(L,*NN*=d) and the entry in CONMTX(L, CN 1) is added thereto to obtain the net horizontal moment for component L. In this case, each component L is viewed as moving to the left with respect to CN 1 (and thus CONMTX(L,CN 1) is added) and to the right with respect to CN 2 (and thus CONMTX(L,CN 2) is subtracted). The net horizontal moments for each component L are then added to the variable NEWSUM to obtain a new horizontal system moment.

In the final step of the subroutine SWCHK, the variable OLDCNSUM is subtracted from the variable NEWCNSUM and if the difference is less than a variable NETCN, then SWITCH is set to one (see block 428). The variable NETCN is chosen arbitrarily depending on the strategy desired by the user. For example, if the user desired that a significant reduction in the component figure of merit be obtained before making an interchange, then NETCN would be made negative, e.g., −5. If, one the other hand, the user desires that components to be interchanged even if *no* or *very little* reduction in component figure of merit is obtained thereby, then NETCN would be set equal to 1 or 0 respectively. It may also be desirable in some circumstances to set NETCN equal to one value for several iterations and then set it equal to another value for subsequent iterations.

Next, the variable OLDSUM is subtracted from the variable NEWSUM and if the difference is less than a variable NET, then SWITCH is set to one. As is the case with the variable NETCN, the variable NET is chosen arbitrarily by the user. The same considerations apply in choosing the value of NET. As noted earlier, setting SWITCH equal to one indicates that the components being examined are to be interchanged. At the conclusion of the final step of the subroutine, the algorithm returns to the main routine and specifically to block 326 of FIG. 3.

After leaving the subroutine SWCHK, the algorithm examines the variable SWITCH to determine if it is zero, i.e., if *no* interchange is to be made (see block 326). If SWITCH = 0, the algorithm moves to block 332. If SWITCH = 1, the algorithm moves to block 328, where the variable CHANGE is set equal to 1, and the matrices PLCMTX, LOCMTX and DELMTX are updated to reflect the subject interchange of CN 1 and CN 2.

Next, in accordance with block 332 the variable I or J is incremented. Specifically, for horizontal adjacencies, the variable J is incremented by one after examination of each pair of components until *J*=*M* (the total number of columns in PLCMTX) immediately after which the variable I is incremented by one and J is reset to *J*=1. After the iteration following this incrementation, J is again incremented by one, etc.

If, after an incrementation of I or J, all horizontal adjacencies have *not* been checked, the algorithm returns to block 318 and the process of composite block 314 is repeated. Repetition of this process continues until *I*=*L* (the total number of rows in PLCMTX) and *J*=*M* (indicating the last of the horizontal adjacencies has been examined), after which the algorithm moves to composite block 244 of FIG. 2.

The steps carried out in composite block 244 are essentially the same as those in composite block 214 except that *vertically* adjacent locations in PLCMTX are examined rather than horizontally adjacent locations. In this case, NN is set equal to 2, the variables I and J are both set equal to 1, and the first two locations examined are PLCMTX (I,J) and PLCMTX (I+1, J). Further, after each examination of two vertically adjacent components, I or J is incremented as follows. First, the variable J is incremented by one after each examination of two components until $J=M+1$, immediately after which, the variable I is incremented by one and J is reset to 1. J is then again successively incremented from 1 through M=1, etc.

Figure 5A:
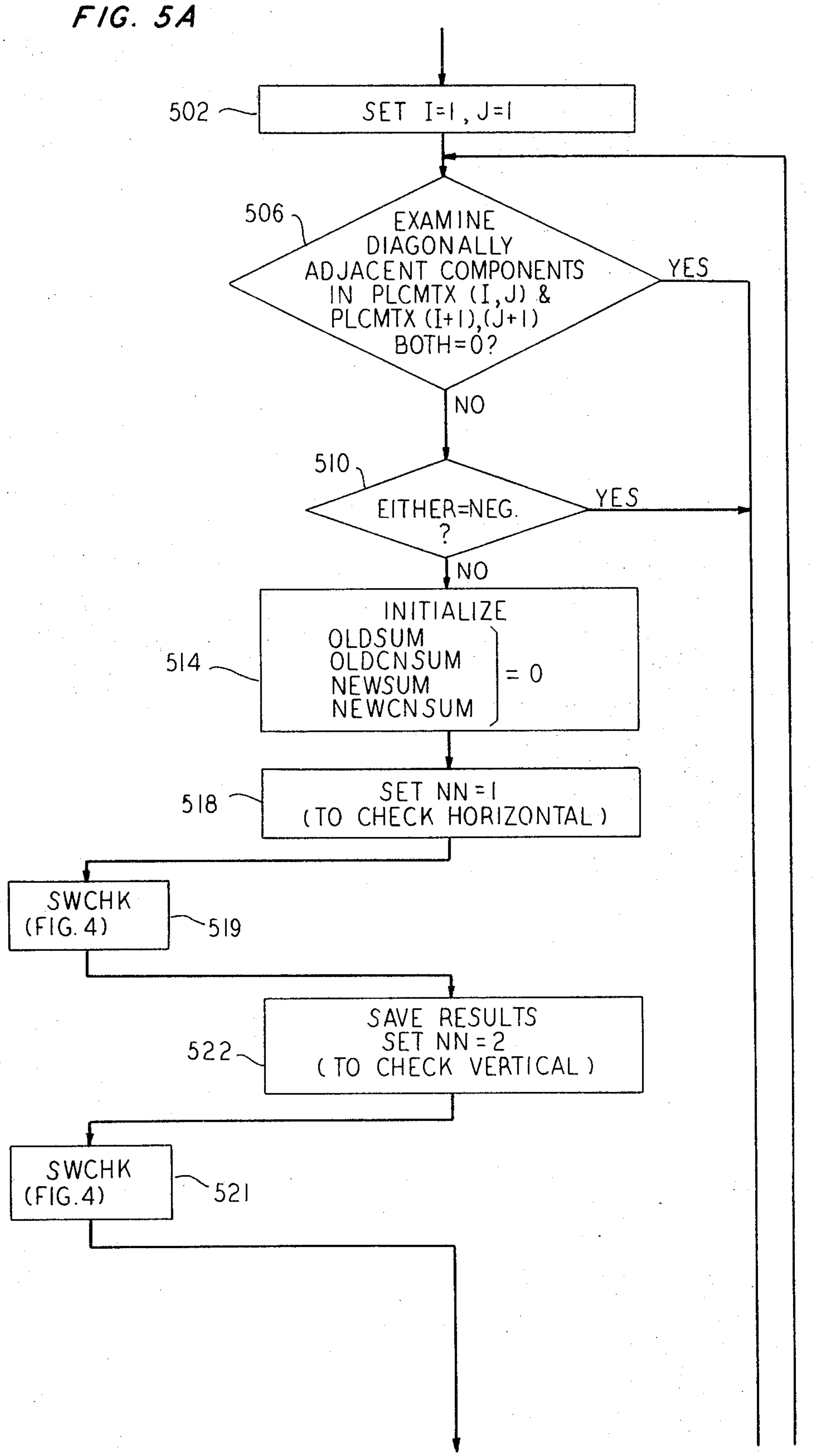
FIG. 5A and 5B show a flow diagram representing the detailed steps of block 248 of the FIG. 2 algorithm.
Figure 5B:
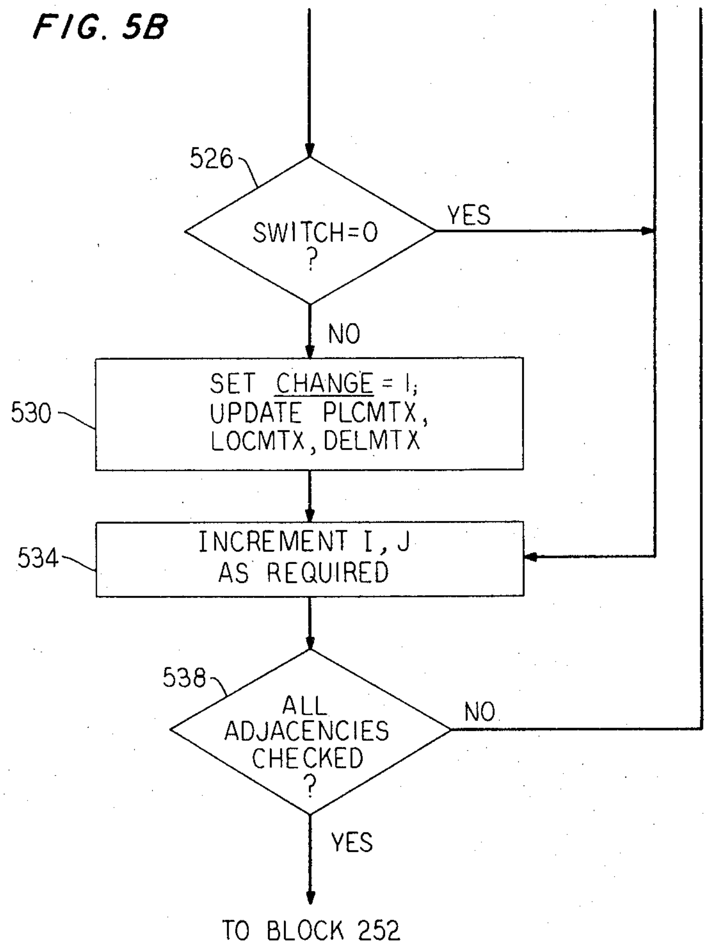
Figure 6:
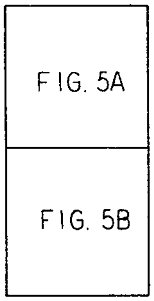
FIG. 6 shows the positioning of FIG. 5A and 5B with respect to each other.

Upon reaching I=L (indicating the last of the vertical adjacencies has been checked), the algorithm commences to examine diagonally adjacent locations (along diagonal toward right) in accordance with block 348 which is shown in detail in FIG. 5A and 5B. The first step here is to set the variables I and J both equal to 1 (see block 502 of FIG. 5A). The next five steps (represented by blocks 506, 510, 514, 518 and 519) are the same as those of blocks 318, 320, 322, 324 and 325 respectively shown in FIG. 3 (which were for strictly horizontal comparison) except that the locations examined are different. Here, the *horizontal* distances between the two components in question and among these components and the other components are examined. In the next step of the algorithm, represented by block 522, the values (for the matrices and various variables) generated by the SWCHK subroutine are stored ("saved") and the variable NN Is set equal to 2. Specifically, the value of the variables OLDSUM, OLDCNSUM, NEWSUM and NEWCNSUM and the newly generated entries for the matrices are stored. The algorithm then goes to the subroutine SWCHK again (block 521) to examine *vertical* distances among the components. Now, in the various steps of the subroutine SWCHK, the previous values of the variables OLDSUM, OLDCNSUM, NEWSUM and NEWCNSUM will not necessarily be zero as is the case for strictly horizontal or vertical adjacencies. If, after the second run through SWCHK, the vertical SWITCH = 1 (indicating that the diagonal interchange is to be made), the algorithm goes to block 530 of FIG. 5B where the variable CHANGE is set equal to 1, and PLCMTX, LOCMTX and DELMTX are updated to reflect the interchange. The FIG. 5A and 5B portion of the algorithm is completed by incrementing I or J as required (i.e., J is successively incremented by one until $J=M$ immediately after which I is incremented by one and J is reset to 1, etc.) and determining if all right diagonal adjacencies have been checked. If all right diagonal adjacencies have *not* been checked, the FIG. 5A and 5B portion of the algorithm is repeated; if all have been checked (indicated by $I=L-1$ and $J=M$) the algorithm moves to block 252 of FIG. 2.

In the step represented by composite block 252 of FIG. 2, the algorithm examines left diagonally adjacent locations in essentially the same manner as right diagonally adjacent locations were examined in composite block 248 except J is initially set equal to 2 rather than 1 and the first two locations examined are PLCMTX (I,J) and PLCMTX (I+1, J−1). In addition, the direction of movement of CN 1 and CN 2 is reversed for the horizontal interchange portion of this diagonal check. As a result of this, instead of invoking the subroutine SWCHK in step 252, a variation thereof is invoked for the horizontal portion of the left diagonal check. This variation of SWCHK differs from SWCHK only in that CN 1 is assumed to move to the left (rather than to the right) and that CN 2 is assumed to move to the right (rather than left) and thus the signs in those equations in SWCHK used to calculate component moments are reversed to reflect such change in movement. Specifically, the following equations are applied in place of those shown in blocks 412, 416 and 424 of FIG. 4:

COMP (CN 1) = DELMTX (CN 1, NN) + W(CN 1, NN) + CONMTX(CN 1, CN 2)

COMP (CN 2) = DELMTX (CN 2, NN) − W(CN 2, NN) − CONMTX(CN 2, CN 1)

$$COMP(L)=\sum_{L=1}^{N} DELMTX(L, NN) - CONMTX(L, CN\ 1)+CONMTX(L, CN\ 2)$$

Finally, after each examination of a pair of left diagonally adjacent component, J is incremented by one until $J=M+1$. Immediately after incrementing J to M+1, the variable I is incremented by one and J is reset to 2. J is then again successively incremented from 2 through M+1, etc. That the last of the left diagonal adjacenies has been examined is indicated by $I=L$.

After completion of the above portion of the algorithm, a variable NIT is incremented indicating that another iteration of the algorithm has been completed (see Block 256). If, after this, $NIT=m$, where $m$ is some arbitrary predetermined value, the variables NETCN and/or NET are changed. For example, for the first $m$=10 iterations, NETCN and NET might both illustratively be set equal to 1. Under these circumstances, interchanges are made even if the component figure of merit or the system moment after such an interchange is only the same as (and not necessarily lower than) the component figure of merit or the system moment respectively before the interchange. After the $(m=10)^{th}$ iteration, NETCH and NET might illustratively be set equal to "0" so that an interchange would only be made if either the component figure of merit or the system moment were lowered thereby. After the $(m=15)^{th}$ iteration, NETCH Might illustratively be set equally to any very large negative number so that an interchange would only be made if the system moment were made lower thereby (i.e., NETCN is made so greatly negative that the lowering of the component figure of merit through an interchange by an amount dictated by the value of NETCN is virtually an impossibility and thus, in effect, interchanges would be made only if the system moment were lowered).

The next step in the process is to examine the variable CHANGE (block 264). If CHANGE = 1, indicating an interchange was made in the course of the previous iteration, then the algorithm returns to block 210 and another iteration is carried out. If CHANGE = 0, indicating no interchanges were made in the previous iteration, then the current is Is printed (block 268) and the algorithm terminates. If no interchanges were made, then presumably the existing placement is "optimum" and no more iterations are necessary, whereas if an interchange was made, then other beneficial interchanges may be possible.

Figures 7A, 7B:
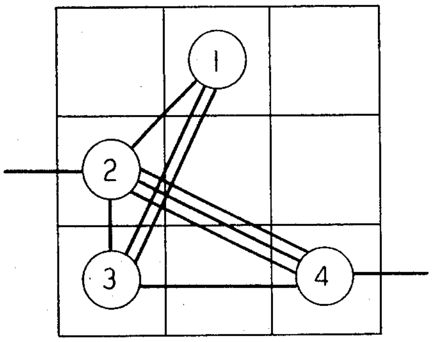
FIG. 7A shows an illustrative initial placement matrix and its corresponding DELMXT (defined later)
FIG. 7B, 7C, 7D, 7E and 7F show representation of the placement matrix of FIG. 7A as it appears after successive applications of the algorithm represented in FIG. 2.

An example showing application of the algorithm to an arrangement of interconnected components will now be given. The initial placement of the components to be examined is shown in FIG. 7A. The arrangement consists of four components—labeled 1, 2, 3 and 4—as shown in the initial placement matrix of FIG. 7A. Component 1 has a single connection to component 2 and two connections to component 3. Component 2, in addition to having the single connection to component 1, has one connection to the left terminal of the structure, one connection to component 3 and three connections to component 4. Component 3, in addition to its previously mentioned connections, has one connection to component 4, which in turn, has one additional connection to the right terminal of the structure. It should be recalled here that connections (distances) to the left of and up from a component are negative while connections (distances) to the right of and down from a component are positive.

The DELMTX for the initial placement is also shown in FIG. 7A. The first row and first column (labeled DH) of DELMTX give the horizontal moment for component 1. The first row and second column (labeled DV) give the vertical moment for component 1, etc. The last row and first column of DELMTX give the sum of the absolute values of the first four rows and first column thereof. This entry is the horizontal system moment for the initial placement. The last row and second column of DELMTX give the vertical system moment for the initial placement.

The entries of the DELMTX are obtained from the initial placement matrix as follows. The horizontal moment of component 1 is obtained by adding the horizontal moment contributions of components 2 and 3 there is no contribution from component 4 since it is not connected to component 1). The contribution of component 2 to the horizontal moment of component 1 is equal to the number of leads connecting component 2 to component 1 (one) multiplied by the distance between the column in which component 1 is located and the column in which component 2 is located (−1), for a total of −1. The contribution of component 3 to the horizontal moment of component 1 is similarly determined to be −2. The total *horizontal* moment of component 1 is thus −3 as indicated in row 1, column DH of DELMTX. The vertical component moment of component 1 is obtained in a similar fashion by adding the vertical moment contributions of components 2 and 3. The contribution of component 2 to the vertical moment of component 1 is equal to the number of leads connecting component 2 to component 1 (one) multiplied by the distance between the row in which component 1 is located and the row in which component 2 is located (+1), for a total of +1. The contribution of component 3 is determined to be +4. Adding the two contributions gives a vertical moment for component 1 of +5 as shown in row, column DV in DELMTX. The contributions of each of the components and the left terminal to the horizontal movement of component 2 are as follows. The left terminal of the structure contributes a −1 because the terminals are considered to occupy an entire row or column removed a distance of one from the immediately adjacent row or column of the placement matrix; component 1 contributes a +1; component 3 contributes no value since it is not located a "horizontal distance" from component 2; and component 4 contributes $$3\left(\frac{\text{Number of}}{\text{connections}}\right)\times(+2)\left(\frac{\text{Number of columns distance}}{\text{between components 2 and 4}}\right)=+6$$

Adding these contributions yields a horizontal moment for component 2 of +6. The vertical moment of component 2 is +3, as indicated in row 2 column DV of DELMTX. This is obtained by adding the vertical moment contribution of component 1 (−1), the vertical moment contribution of component 3 (+1), and the vertical moment contribution of component 4 (+3) for the total of +3. The moments of the other components are calculated in a similar manner.

In applying the algorithm of the present invention to the initial placement shown in FIG. 7A, the variables NETCN and NET were set equal to 1 for $m$=10 iterations of the algorithm. After 10 iterations, both the variables were set equal to 0. No further changes in these variables were necessary since the arrangement was "optimized" after 12 iterations after the first change in the variables.

FIG. 7B shows the horizontal interchanges that are made during the first iteration of the algorithm. The interchange in each of the three matrices thereshown is indicated by the arrow. Thus in the first matrix, component 1 is shown moving from row 1, column 2 to the row 1, column 1, etc. The column shown under each of the matrices in FIG. 7B represents the first column of DELMTX obtained as a result of the interchange shown in the corresponding matrix. (Only the DH column is shown since only that column is affected by a horizontal interchange.) Thus, for example, the DH column of DELMTX contains the entries 0 for component 1 (row 1), 5 for component 2 (row 2), 2 for component 3 (row 3), and −7 for component 4 (row 4). These entries, of course, give the horizontal moments for components 1 through 4 after the interchange in question.

Figure 7C:
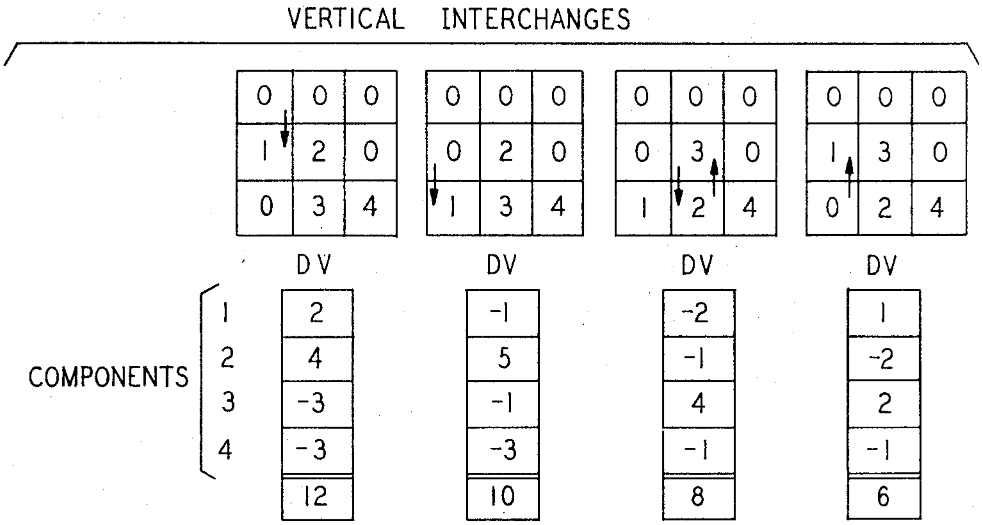

The vertical interchanges made during the first iteration of the algorithm are shown in FIG. 7C. The DV column of DELMTX after each such interchange is shown under the corresponding matrix.

Figure 7D:
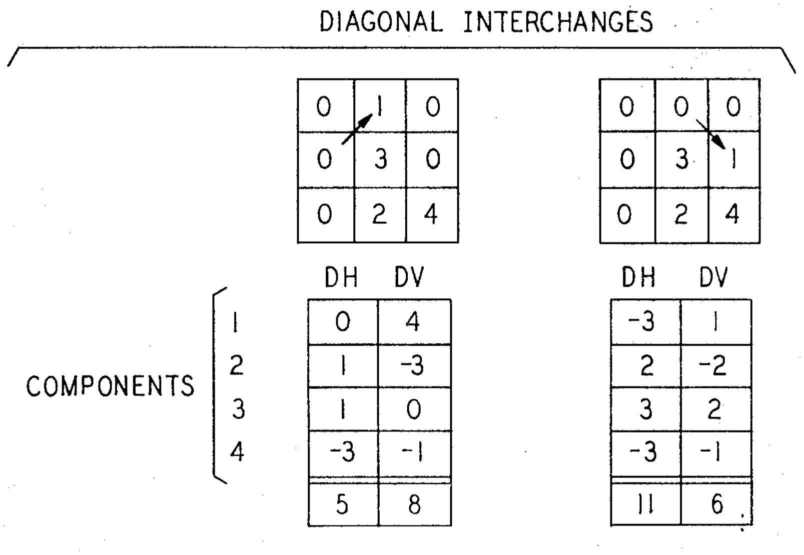

FIG. 7D shows the diagonal interchanges made in the course of the first iteration of the algorithm, both of which are right diagonal interchanges. In this case since both columns of the DELMTX are affected by the interchanges, both columns are shown underneath the corresponding matrix of FIG. 7D.

Figure 7E:
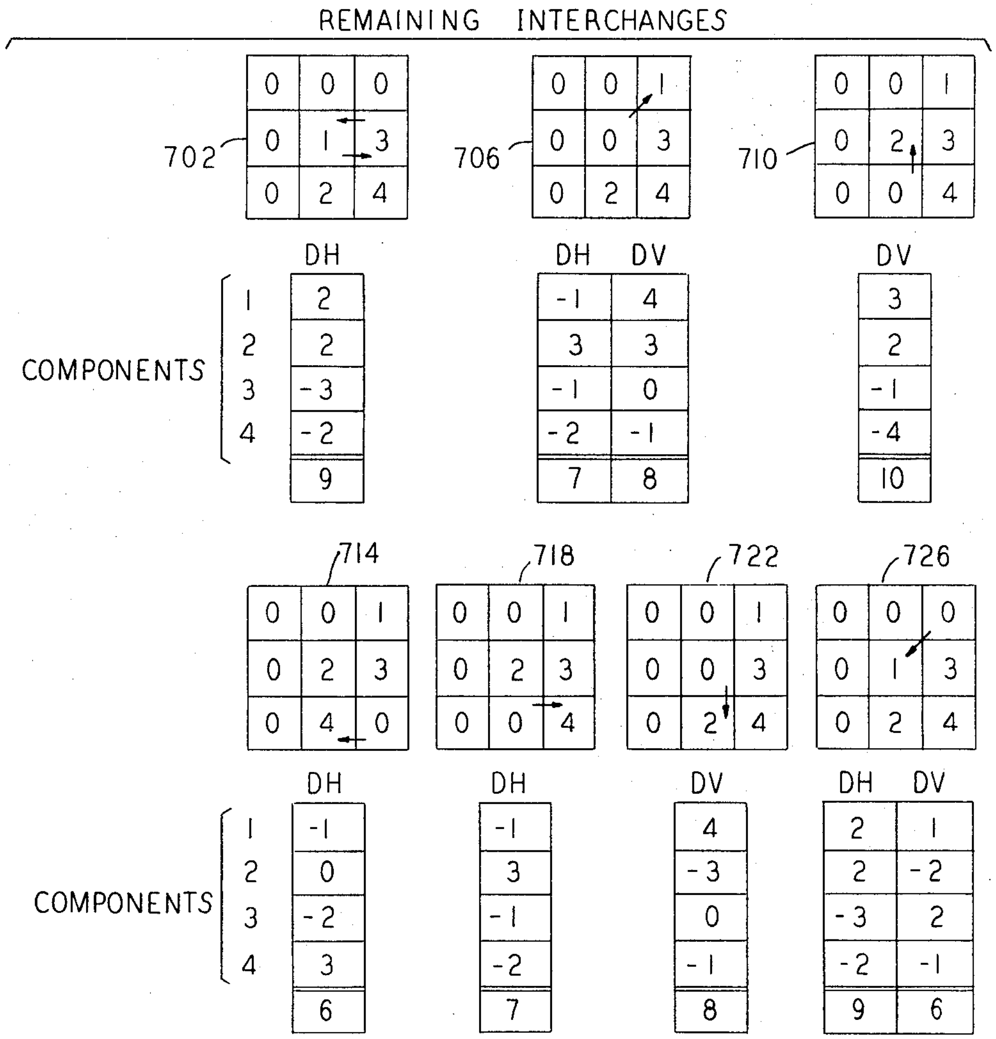
Figure 7F:
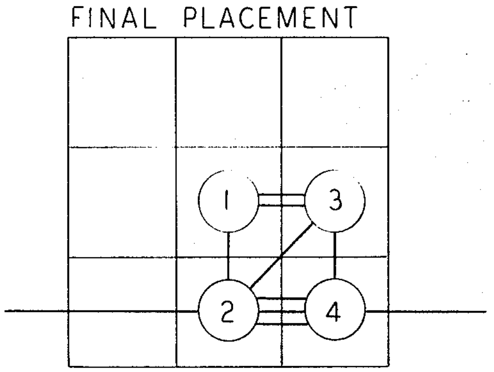

FIG. 7E shows the remaining interchanges made by the algorithm before arriving at the final placement shown in FIG. 7F. These interchanges are made in the course of successive iterations of the algorithm of FIG. 2. Note that the position of the components after the interchange shown in matrix 726 is identical to that shown in matrix 702. Because of this, the algorithm repeats the interchanges shown by matrices 706, 710, 714, 722 and 726 several times until the total number of iterations, NIT, carried out by the algorithm reaches 10. Upon reaching 10, the variables NETCN and NET, as indicated earlier, are set equal to 0 so that an interchange is made only if such interchange results in lowering either the sum of the absolute values of the moments of the compounds interchanged or the system moment. The position of the components upon reaching 10 iterations is as shown in matrix 714.

After setting the variables NETCN and NET equal to 0 the interchanges shown by matrices 718, 722, and 726 are made. In all three cases, interchanges were made because the sums of the absolute value of the moments of the components interchanged were lowered. After the interchange shown in matrix 726, no more interchanges are made and the algorithm terminates. As can be seen by the final placement shown in FIG. 7F, the components are arranged in a "balanced" configuration.

Composite FIG. 8 shows a programming implementation of the algorithm of FIG. 2. The program was written in PL 1 language and was implemented on an IBM 360/65 computer. Implementation of the algorithm of FIG. 2 in the program of FIG. 8 is apparent from an examination of FIg. 8 and is therefore not described further.

It is to be understood that the above-described embodiment is only illustrative of the application of the principles of the present invention. Modifications in this embodiment may be devised by those skilled in the art without departing from the spirit and scope of the invention.

What is claimed is:

1. A machine process for assigning N electronic components to locations in a planar matrix having top, bottom, left, and right terminals, said components being initially positioned in any configuration, comprising the steps of interchanging horizontally adjacent components $i$ and $j$ if the system moment $$SM=\sum_{k=1}^{N}|MH_k|+\sum_{k=1}^{N}|MV_k|$$

is made lower thereby, where $$MH_i=\sum_{k=1}^{N}W_{ik}DH_{ik}+\sum_{k=L,R}W_{ik}DH_{ik}$$

$$MV_i=\sum_{k=1}^{N}W_{ik}DV_{ik}+\sum_{k=T,B}W_{ik}DV_{ik}$$

$W_{ik}$ equals the number of connections from component $i$ to component (or terminal) $k$, $DH_{ik}$ is the horizontal distance between component $i$ and component (or terminal) $k$, $DV_{ik}$ is the vertical distance between component $i$ (or terminal) $k$, the symbols $L$, $R$, $T$ and $B$ represent the left, right, top and bottom terminals respectively of said planar matrix and where one direction of the vertical is positive and the other is negative and one direction of the horizontal is positive and the other is negative, interchanging vertically adjacent components if the system moment SM is made lower thereby, and interchanging diagonally adjacent components if the system moment SM is made lower thereby.

2. A process as in claim 1 further comprising the steps of interchanging horizontally adjacent components $i$ and $j$ if the sum $$|MH_i|+|MH_j|$$

is made lower thereby, interchanging vertically adjacent components $i$ and $j$ if the sum $$|MV_i|+|MV_j|$$

is made lower thereby, and interchanging diagonally adjacent components $i$ and $j$ if the sum $$|MH_i|+|MH_j|+|MV_i|+|MV_j|$$

is made lower thereby.

3. In a data processing system, a method of assigning interconnected electronic components to locations in a planar matrix having top, bottom, left and right terminals comprising the steps of 1. randomly assigning the components to locations in the matrix,
2. interchanging horizontally adjacent components $i$ and $j$ if either (a)

$$\left(\left|MH_i=\sum_{k=1}^{N}W_{ik}DH_{ik}+\sum_{k=L,R}W_{ik}DH_{ik}\right|+\left|MH_j=\sum_{k=1}^{N}W_{jk}DH_{jk}+\sum_{k=L,R}W_{jk}DH_{jk}\right|\right)-\left(\left|MH_i^*=\sum_{k=1}^{N}W_{ik}^*DH_{ik}^*+\sum_{k=L,R}W_{ik}^*DH_{ik}^*\right|+\left|MH_j^*=\sum_{k=1}^{N+2}W_{jk}^*DH_{jk}^*+\sum_{k=L,R}W_{jk}^*DH_{jk}^*\right|\right)<NETCN, \text{ or}$$

(b)

$$\left(SM=\sum_{k=1}^{N}|MH_k|+\sum_{k=1}^{N}|MV_k|\right)-\left(SM^*=\sum_{k=1}^{N}|MH_k^*|+\sum_{k=1}^{N}|MV_k^*|\right)<NET,$$

where $W_{ik}$ equals the number of connections from component $i$ to component (or terminal) $k$, $DH_{ik}$ is the horizontal distance between component $i$ and component (or terminal) $k$, $$MV_i=\sum_{k=1}^{N}W_{ik}DV_{ik}+\sum_{k=T,B}W_{ik}DV_{ik},\ DV_{ik}$$

is the vertical distance between component $i$ and component (or terminal) $k$, $N$ is the total number of components, $L$, $R$, $T$ and $B$ represent the left, right, top and bottom terminals respectively of said planar matrix, the parameters identified by an asterisk * represent the component parameters before an interchange and the parameter not identified by an asterisk * represent the component parameters after the interchange, NETCN and NET are variables initially set equal to 1, and where distances to the right of and down from a component are positive and distances to the left of and up from a component are negative.

4. A method as in claim 3 further comprising the step of 3. interchanging vertically adjacent components $i$ and $j$ if either a. $(|MV_i|+|MV_j|)-(|MV_i^*|+|MV_j^*|)<NETCN$, or b. $SM-SM^*<NET$.

5. A method as in claim 4 further comprising the step of 4. interchanging diagonally adjacent components $i$ and $j$ if either 2. $(MH_i + MH_j + MV_i + MV_j) -(MH_i^* + MH_j^* + MV_i^* + MV_j^*)<NET$

B. $SM-SM^*<NET$.

6. A method as in claim 5 further comprising the steps of 5. repeating steps (2) through (4) if a. any interchange of components shall have been made in steps (2) through (4), and b. the number of iterations of steps (2) through (4) is less than $m$, an arbitrary integer and 6. terminating the process if no interchange of components shall have been made in steps (2) through (4).

7. A method as in claim 6 further comprising the steps of 7. performing steps (2) through (4) for NETCN = 0 and NET = 0,
8. repeating step (7) if a. any interchange of components shall have been made in step (7), and b. the number of iterations of steps (2) through (4) and step (7) is less than $n$, an arbitrary integer greater than $m$, and 9. terminating the process if no interchange of components shall have been made in step (7).

8. A method as in claim 7 further comprising the steps of 10. interchanging horizontally adjacent components $i$ and $j$ if $$SM-SM^*<0$$

11. interchanging vertically adjacent components $i$ and $j$ if $$SM-SM^*<0$$

12. interchanging diagonally adjacent components $i$ and $j$ if $$SM-SM<B0$$

13. repeating steps (10) through (12) if a. any interchange of components shall have been made in steps (10) through (12), and b. the number of iterations of steps (2) through (4), (7), and (10) through (12) which shall have been performed is less than $g$, an arbitrary integer greater than $n$ and 14. terminating the process if no interchange of components shall have been made in steps (10) through (12) or if the number of iterations of steps (2) through (4), (7), and (10) through (12) which shall have been performed equals $q$.

9. A process for determining the placement of N interconnected electronic circuit objects on a planar matrix structure comprising the steps of 1. reading into the memory of a digital computer digital representations of (a) an L by M placement matrix, PLCMTX, which defines the placement of said objects on the planar matrix structure, (b) an N+1 by N+1 connection matrix CONMTX, in which the entry at the intersection of row $i$ and column $j$ specifies the number of interconnections between the $i^{th}$ and $j^{th}$ (c) and N+1 by 2 location matrix, LOCMTX, in which the entries at the intersections of row $i$ with the $1^{st}$ and $2^{nd}$ column specify the row and column respectively in PLCMTX where object $i$ is located, and (d) an N+1 by 4 terminal matrix, TRMMTX, in which the entries at the intersections of row $i$ with the $1^{st}$, $2^{nd}$, $3^{rd}$ and $4^{th}$ columns specify the number of connections from object $i$ to the top, bottom, left and right edges respectively of PLCMTX,
2. calculating digital representations of an N+1 by 2 composite weight matrix W in which the entry at the intersection of row $i$ and the $1^{st}$ column thereof represents the sum of the entries of row $i$ of CONMTX plus the entries of row $i$ and the $3^{rd}$ and $4^{th}$ columns of TRMMTX and wherein the entry at the intersection of ROW $i$ and the $2^{nd}$ column of said W matrix represents the sum of the entries of row $i$ of CONMTX plus the entries of row $i$ and the $1^{st}$ and $2^{nd}$ columns of TRMMTX,
3. calculating digital representations of an N+2 by 2 matrix, DELMTX, in which the entry at the intersection of row $i$ and the $1^{st}$ columns specifies the net horizontal moment for object $i$ equal to $$\sum_{k=1}^{N}W_{ik}DH_{ik}+\sum_{k=L,R}W_{ik}DH_{ik}$$

the entry at the intersection of row $i$ and the $2^{nd}$ column specifies the net vertical moment for object $i$ equal to $$\sum_{k=1}^{N}W_{ik}DV_{ik}+\sum_{k=T,B}W_{ik}DV_{ik}$$

the entry at the intersection of row N+1 and the 1st column thereof specifies the net horizontal system moment which equals $$\sum_{k=1}^{N}|MH_k|$$

and the entry at the intersection of row N+1 and the 2nd column specifies the net vertical system moment which equals $$\sum_{k=1}^{N}|MV_k|$$

where $W_{ik}$ represents the number of connections from object *i* to object (or PLCMTX edge) *k*, $DH_{ik}$ represents the horizontal distance between object *i* and object (or PLCMTX edge) *k*, $DV_{ik}$ represents the vertical distance between object *i* and object (or PLCMTX edge) *k*, the symbols L, R, T and B represent the left, right, top and bottom edges of PLCMTX, and where distances to the left of and up from an object in PLCMTX are negative and distances to the right of and down from an object in PLCMTC are positive, 4. setting a variable CHANGE = 0,
5. setting a variable *I*=1 and a variable *J*=1,
6. going to step (19) if no objects are located in PLCMTX (I,J) or PLCMTX (I,J+1),
7. setting variables OLDSUM, OLDCNSUM, NEWSUM and NEWCNSUM equal to 0 and a variable *NN*=1, if an object is located in either PLCMTX (I,J) or PLCMTX (I,J+1), where the entry of PLCMTX (I,J) is identified as CN 1 and the entry of PLCMTX (I,J+1) is identified as CN 2,
8. calculating and storing

OLDSUM = OLDSUM + DELMTX (*N*+1, *NN*), 9 calculating and storing

OLDCNSUM = OLDCNSUM + ABS [DELMTX (*CN* 1, *NN*)] +*ABS*[DELMTX (*CN* 2, *NN*)], 10. calculating and storing a value COMP (*CN* 1) = DELMTX (*CN* 1, *NN*) −*W* (*CN* 1, *NN*) − CONMTX (*CN* 1, *CN* 2), 11. calculating and storing a value COMP (*CN* 2) = DELMTX (*CN* 2, *NN*) + *W* (*CN* 2, *NN*) + CONMTX (*CN* 2, *CN* 1

12. calculating and storing a value

NEWCNSUM = NEWCNSUM +ABS [COMP (*CN* 1) + ABS [COMP (*CN* 2)], 13. calculating and storing a value

NEWSUM= NEWSUM + ABS [COMP (*CN* 1)] + ABS [COMP (*CN* 2)], 14. calculating a value $$COMP(L)=\sum_{L=1}^{N}DELMTX(L, NN) +CONMTX(L, CN1)-CONMTX(L, CN2)$$

where the summation Σ is carried out for all objects *L* except *CN* 1 and *CN* 2, 15. calculating and storing

NEWSUM = NEWSUM + COMP (*L*), 16. setting SWITCH = 1 if

NEWCNSUM − OLDCNSUM < NETCN, or if NEWSUM − OLDSUM < NET, otherwise setting SWITCH = 0, where NETCN and NET are variables each of arbitrarily chosen value, 17. going to step (19) if SWITCH = 0,
18. setting CHANGE = 1 and updating PLCMTX, LOCMTX and DELMTX to reflect the interchange of the entries of PLCMTX (I,J) and PLCMTX (I,J+1) if SWITCH = 1,
19. incrementing J by one,
20. if *J*=*M*, incrementing I by one and setting *J*=1, and
21. repeating steps (6) through (20until *I*=*L* and *J*=*M*.

10. A process as in claim 9 further comprising the steps of 22. setting *I*=I and *J*=1 if *I*=*L* and *J*=*M*,
23. going to step (28) if no objects are located in PLCMTX (I,J) or PLCMTX (I+1,J),
24. setting variables OLDSUM, OLDCNSUM, NEWSUM, and NEWCNSUM equal to 0 and variable *NN*=2 if an object is located in either PLCMTX (I,J) or PLCMTX (I+1,J), where the entry of PLCMTX (I,J) is identified as CN 1 and the entry of PLCMTX (I+1,J) is identified CN 2,
25. performing steps (8) through (16),
26. going to step (28) if SWITCH = 0,
27. setting CHANGE =1 and updating PLCMTX, LOCMTX and DELMTX to reflect the interchange of the entries of PLCMTX (I,J) and PLCMTX (I+1,J) if SWITCH = 1,
28. incrementing J by one,
29. if *J*=*M*+1, incrementing I by one and setting *J*=1, and
30. repeating steps (23) through (29) until *I*=*L*.

11. A process as in claim 10 further comprising the steps of 31. setting *I*=1 and *J*=1 if *I*=*L*,
32. going to step (39) if no objects are located in PLCMTX (I,J) or PLCMTX (I+1,J+1),
33. setting variables OLDSUM, OLDCNSUM, NEWSUM, and NEWCNSUM equal to 0 and variable *NN*=1 if an object is located in either PLCMTX (I,J) or PLCMTX (I+I,J+1), where the entry of PLCMTX (I,J) is identified as CN 1 and the entry of PLCMTX (I+1, J) is identified as CN 2,
34. performing steps (8) through (16),
35. setting *NN*=2,
36.performing steps (8) through (16),
37. going to step (39) if SWITCH = 0,
38. setting CHANGE = 1 and updating PLCMTX, LOCMTX and DELMTX to reflect the interchange of the entries of PLCMTX (I,J) and PLCMTX (I+1,J+1) if SWITCH = 1,
39. performing steps (19) and (20), and
40. repeating steps (32) through (39) until *I*=*L*−1 and *J*=*M*.

12. A process as in claim 11 further comprising the steps of 41. setting *I*=1 and *J*=2 if *I*=*L*−1 and *J*=*M*,
42. going to step (53) if no objects are located in PLCMTX (I,J) or PLCMTX (I+1, J−1),
43. performing steps (8) and (9,
44. calculating and storing a value COMP (*CN* 1) = DELMTX (*CN* 1, *NN*) + *W* (*CN* 1, *NN*) + CONMTX (*CN* 1, *CN*2), 45. calculating and storing a value COMP (*CN* 2) = DELMTX (*CN* 2, *NN*) − *W* (*CN* 2, *NN*) − CONMTX (*CN* 2, *CN* 1), 46. performing step (13),
47. calculating and storing a value $$COMP(L)=\sum_{L=1}^{N}DELMTX(L, NN) -CONMTX(L, CN1)+CONMTX(L, CN2)$$

where the summation Σ is carried out for all objects *L* except *CN* 1 and *CN* 2, 48. performing steps (15) and (16),
49. setting *NN*=2,
50. performing steps (8), (9) and (44) through (48),
51. going to step (53) if SWITCH = 0,
52. setting CHANGE = 1 and updating PLCMTX, LOCMTX and DELMTX to reflect the interchange of the entries of PLCMTX (I,J) and PLCMTX (I+1, J−1) if SWITCH = 1,
53 incrementing J by one.
54. if *J*=*M*+1, incrementing I by one and setting *J*=2,
55. repeating steps (42) through (54) until *I*=*L*.

13. A process as in claim 12 further comprising the steps of 56. incrementing a variable NIT by one if *I*=*L*, where NIT represents the number of iterations of steps (4) through (55), 57. decrementing NETCN and NET if $NIT = m$ and incrementing $m$, where $m$ is an arbitrarily chosen variable,
58. repeating steps (4) through (57) if CHANGE = 1, and
59. terminating the process if CHANGE = 0.

14. A process as in claim 13 wherein NETCN and NET are initially set equal to 1 and wherein step (57) comprises the step of decrementing NETCN and NET to 0 if $NIT = m$.

* * * * *